UNITED STATES PATENT OFFICE.

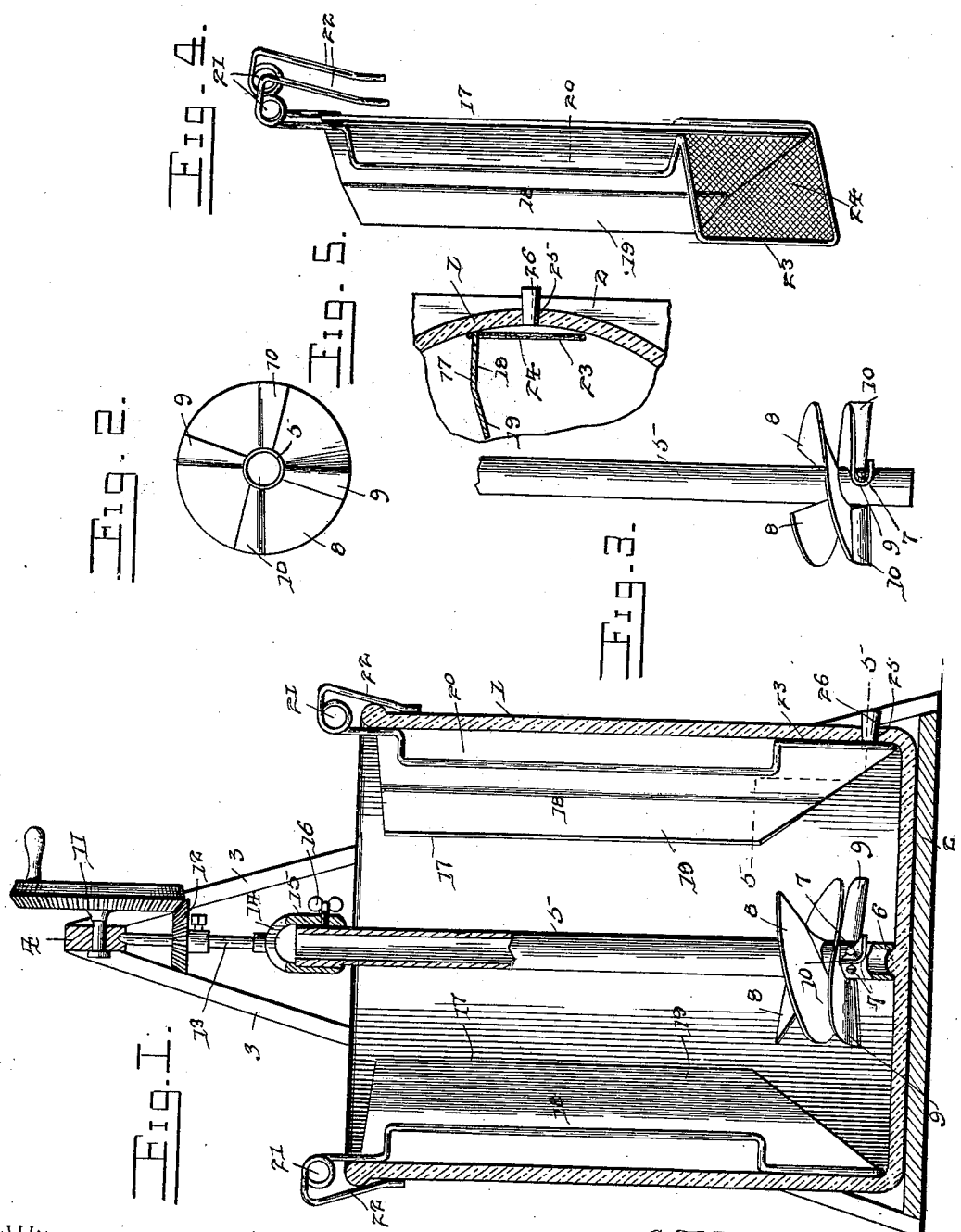

SAMUEL T. PORTER, OF LA GRANGE, ILLINOIS, ASSIGNOR OF ONE-HALF TO E. W. PORTER, OF LEWISTOWN, MISSOURI.

CHURN.

SPECIFICATION forming part of Letters Patent No. 667,250, dated February 5, 1901.

Application filed March 17, 1900. Serial No. 9,072. (No model.)

*To all whom it may concern:*

Be it known that I, SAMUEL T. PORTER, a citizen of the United States, residing at La Grange, in the county of Lewis and State of Illinois, have invented a new and useful Churn, of which the following is a specification.

This invention relates to churns, and has for one object to provide an improved form of rotary dasher to force the cream outwardly in radial directions from the dasher and to introduce air into the volume of cream to effectually aerate the same, and thereby effect a quick and complete separation of the butter.

A further object is to provide an improved form of breaker for detachable application to the body of the churn, so as to intercept the outwardly-impelled cream and break up the same, thereby increasing the agitation of the cream.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a vertical sectional elevation of a churn constructed in accordance with the present invention. Fig. 2 is a detail bottom plan view of the dasher. Fig. 3 is a detail side elevation of the dasher. Fig. 4 is a detail perspective view of one of the detachable breakers. Fig. 5 is a detail transverse sectional view taken on the line 5 5 of Fig. 1.

Corresponding parts in the several figures of the drawings are designated by like characters of reference.

Referring to the accompanying drawings, 1 designates the body of the churn, which is supported upon a frame comprising a base 2, one or more uprights 3 at opposite sides of the base, and a transverse bar 4, which connects the upper ends of the opposite uprights.

Located centrally within the churn-body is an upright hollow rotary dasher-stem 5, the lower end of which receives a suitable lug or projection 6 upon the bottom of the churn to form a journal for the dasher-stem. The lower portion of the dasher-stem is provided with a marginal series of perforations 7 for the passage of air from the interior of the dasher-stem to the interior of the churn to intermingle with the cream and effectually aerate the latter.

The dasher is formed by means of a pair of outwardly-directed marginal spiral flanges 8, which intertwine so that their upper ends are upwardly deflected, and their lower ends are adjacent to the bottom of the churn-body and also deflected downwardly. The lower extremity of each spiral flange or dasher-blade is rebent upon the under side, so as to form a semitubular flange 9, which partly embraces the adjacent perforation 7, so as to form a substantially radial conveyer for the air which is discharged from the hollow stem. Similar semitubular flanges 10 are provided upon the under side of each spiral blade and in advance of the flanges 9, so as to partly embrace the other perforations.

The dasher is driven by means of a master-gear 11, mounted upon the cross-bar 4 of the frame and in mesh with a beveled gear 12, carried by an upright stub-shaft 13, the upper end of which finds a bearing in the under side of the cross-bar. The lower end of this stub-shaft is provided with a yoke 14, that carries a ring or collar 15 for the reception of the upper end of the dasher-stem, and a suitable set-screw 16 is employed to connect the stem and the ring or collar.

To increase the agitation of the cream, there are provided one or more breakers that extend inwardly from the sides of the churn-body and are detachably connected thereto. As indicated in Fig. 4 of the drawings, each breaker comprises a sheet-metal plate 18, the lower edge of which is beveled or inclined inwardly, and the shorter longitudinal edge portion of the plate is bent or deflected to form a flange 19. The body of the plate is stiffened and clamped between the opposite portions of a stiff spring-wire 20, the opposite end portions of which extend above the plate and are twisted into the spring-coils 21 and the spring arms or jaws 22 to embrace the upper edge of the mouth of the churn-body, as shown in Fig. 1, so that the breaker is held substantially at right angles to the adjacent wall of the churn. The lower portion of the wire is offset into a substantially rectangular loop or frame 23, that is covered by means of a sheet of wire-cloth or other foraminous material 24 to form a strainer, which is placed across the inner end of the drain-opening 25, formed in one side of the churn-body and adjacent to the bottom thereof. This opening is normally closed by a plug 26 or other suitable closure that is operable from the exterior of the churn. These breakers are designed for use especially with a circular or cylindrical churn-body to prevent the cream from having a regular swirl and to increase the agitation of the cream. One or more of these breakers may be employed, and they are removable in order that they may be readily cleansed. The lower edges of the breakers are inclined upwardly and inwardly toward the center of the churn, so as to accommodate different sizes of dashers and in order that a large dasher may revolve beneath said inclined edges.

By reference to Fig. 5 of the drawings it will be seen that by reason of the angularly-related disposition of the breaker-blade and the strainer the latter rests against the inner wall of the churn-body, and thereby forms a lateral brace for the breaker, so as to resist lateral strain and prevent the breaker from being swung around against the churn-body by the force of the swirl of cream. Thus the breaker is detachably held to the churn-body and is also braced against being displaced by the moving volume of cream.

From the foregoing description it will be apparent that the present invention provides an exceedingly simple and useful churn, the parts of which may be readily assembled and also disconnected for the purpose of cleansing, and the cream is thoroughly agitated and aerated in a simple and convenient manner.

What I claim is—

1. In a churn, a rotary dasher, comprising a hollow stem, having perforations, and outwardly-directed spiral blades, having their ends rebent to embrace respective perforations, and form radial conveyers for the air discharged through the perforations.

2. In a churn, a churn-body having a drain-opening formed through one side thereof, and a breaker carried by the body of the churn, and having an angularly-related strainer disposed across the drain-opening, bearing against the churn-body, and forming a lateral brace for the breaker.

3. In a churn, a churn-body having a drain-opening formed through one side thereof, a breaker removably carried by the churn-body, and having a stiffening-wire, a portion of the latter being formed into a laterally-offset frame, and a foraminous covering for the frame and forming a strainer disposed across the drain-opening, said frame being in contact with the churn-body and forming a lateral brace for the breaker.

4. In a churn, the combination with the body thereof, having an opening in one side thereof, of a breaker, having a stiffening-wire that embraces opposite sides of the breaker, the upper portions of the wire being formed into spring-jaws for engagement with the upper edge of the churn-body, and the opposite portion of the wire being formed into a laterally-offset frame, and a sheet of foraminous material covering the frame, to form a strainer for covering the opening in the churn-body.

5. A breaker for a churn, comprising a sheet-metal plate, having an upwardly and outwardly inclined lower edge, and bent longitudinally to form a laterally-inclined flange, a stiffening-wire, which is bent intermediate of its ends to embrace opposite sides of the plate, the opposite ends of the wire extending above the plate and formed into spring-jaws, and the lower or intermediate portion of the wire being formed into a frame, and a sheet of foraminous material covering the frame to form a strainer.

In testimony that I claim the foregoing as my own I have hereto affixed my signature in the presence of two witnesses.

SAMUEL T. PORTER.

Witnesses:
J. H. NOLIN,
HARRY NORMAN.